United States Patent [19]

Shaw et al.

[11] Patent Number: 4,671,658
[45] Date of Patent: * Jun. 9, 1987

[54] FIBER OPTIC ROTATION SENSOR UTILIZING A MAGNETIC SHIELD AND AN OPTICAL ISOLATOR

[75] Inventors: Herbert J. Shaw, Stanford; Ralph A. Bergh; Herve C. Lefevre, both of Palo Alto, all of Calif.

[73] Assignee: The Board of Trustees of the Leland Stanford Junior University, Stanford, Calif.

[*] Notice: The portion of the term of this patent subsequent to Oct. 18, 2000 has been disclaimed.

[21] Appl. No.: 319,311

[22] Filed: Nov. 9, 1981

Related U.S. Application Data

[63] Continuation-in-part of Ser. No. 307,095, Sep. 30, 1981, abandoned, which is a continuation-in-part of Ser. No. 249,714, Mar. 31, 1981, Pat. No. 4,410,275.

[51] Int. Cl.[4] .......................... G01B 2/02; G01C 19/64
[52] U.S. Cl. ..................................................... 356/350
[58] Field of Search ........................................ 356/350

[56] References Cited

U.S. PATENT DOCUMENTS

| 3,890,047 | 6/1975 | Warner | 356/350 |
| 4,280,766 | 7/1981 | Goss et al. | 356/350 |
| 4,299,490 | 11/1981 | Cahill et al. | 356/350 |
| 4,352,563 | 10/1982 | McLandrich | 356/350 |
| 4,480,915 | 11/1984 | Arditty et al. | 356/350 |

FOREIGN PATENT DOCUMENTS 2446482 8/1980 France .

OTHER PUBLICATIONS

"Single-Mode Fiber-Optical Power Divider; Encapsulated Etching Technique", S. K. Sheem, et al., Optics Letters, vol. 5, No. 1, Jan. 1979, pp. 29-31.

Primary Examiner—Vincent P. McGraw
Attorney, Agent, or Firm—Knobbe, Martens, Olson & Bear

[57] ABSTRACT

A fiber optic rotation sensor, employing the Sagnac effect, comprises all fiber optic components, positioned along a continuous, uninterrupted strand of fiber optic material. The rotation sensor includes a detection system utilizing a modulator for phase modulating light waves which counterpropagate through a loop formed in the fiber optic strand. The modulator is operated at a specific frequency to eliminate amplitude modulation in the detected optical output signal. The rotation sensor is mounted in a $\mu$-metal housing to shield it from the effects of ambient magnetic fields. An isolator is utilized to prevent the optical output signal from returning to the laser source. This advantageously reduces power losses in the system by eliminating the need for a coupler to couple the output signal to a detector.

3 Claims, 17 Drawing Figures

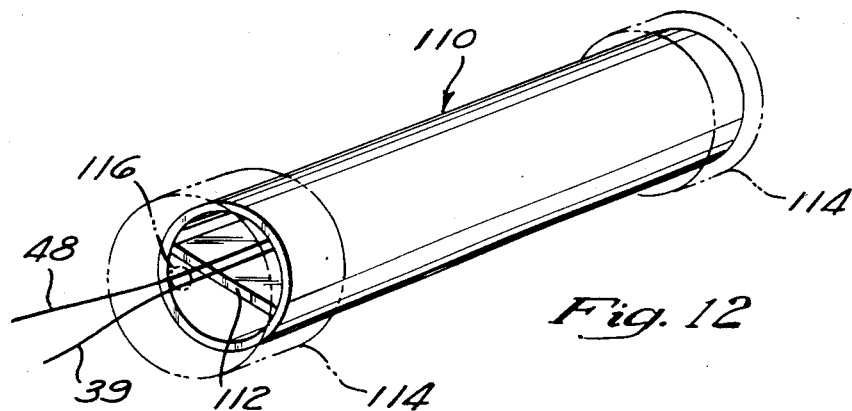
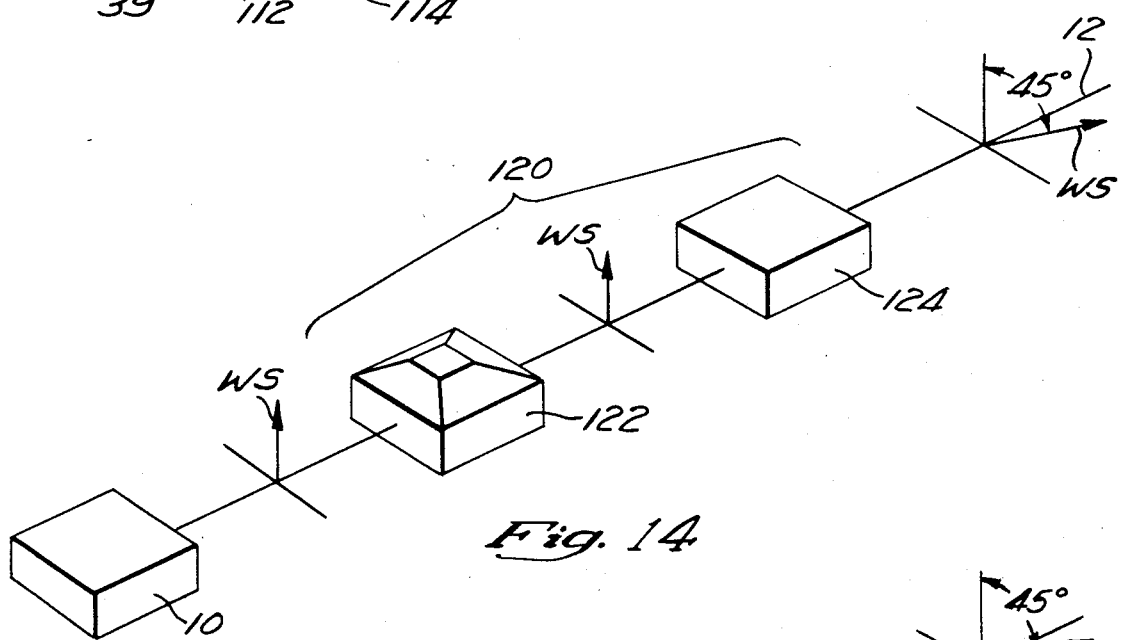
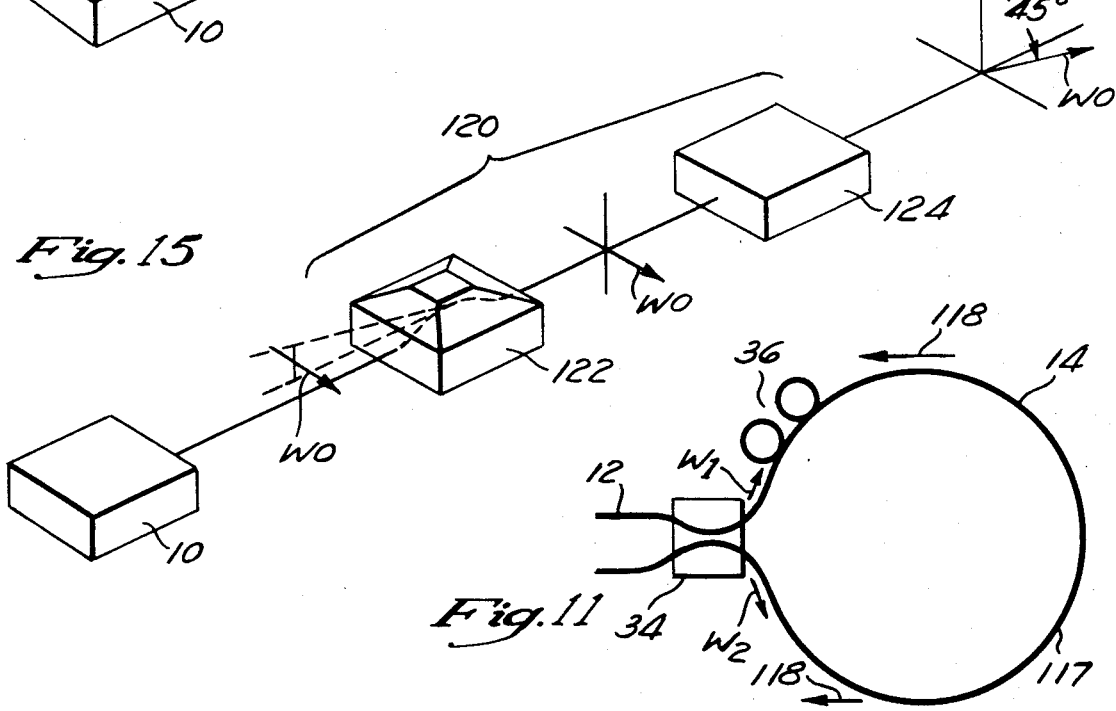

FIBER OPTIC ROTATION SENSOR UTILIZING A MAGNETIC SHIELD AND AN OPTICAL ISOLATOR

BACKGROUND OF THE INVENTION

This is a continuation in part of our co-pending patent application, Ser. No. 307,095, filed Sept. 30, 1981, now abandoned, which is a continuation in part of our co-pending patent application, Ser. No. 249,714, filed Mar. 31, 1981, now issued as U.S. Pat. No. 4,410,275, entitled "Fiber Optic Rotation Sensor", both of which are assigned to the assignee of this invention.

The present invention relates to rotation sensors, such as gyroscopes, and particularly to a fiber optic rotation sensor.

Fiber optic rotation sensors typically comprise a loop of fiber optic material to which light waves are coupled for propagation around the loop in opposite directions. Rotation of the loop creates a relative phase difference between counterpropagating waves, in accordance with the well known "Sagnac effect," with the amount of phase difference corresponding to the velocity of rotation. The counterpropagating waves, when recombined, interfere constructively or destructively to produce an optical output signal which varies in intensity in accordance with the rotation rate of the loop. Rotation sensing is commonly accomplished by detection of this optical output signal.

Systems of this type have heretofore employed bulk optical components for processing and directing the light applied to the sensing loop. While these devices provide a substantial improvement over other types of rotation sensors, they are subject to certain limitations and other disadvantages. For example, the various system components must be aligned with each other within very close tolerances for the system to function properly. This critical alignment is often difficult to establish and maintain, particularly where the system is subjected to mechanical vibration, thermal changes, and other physical disturbances. Rotation sensors utilizing the Sagnac effect for rotation sensing typically require a compensating system to provide operating stability. One type of compensating system is described by R. Ulrich in an article entitled "Fiber Optic Rotation Sensing with Low Drift" (Optics Letters, May 1980, Vol. 5, No. 5). This approach involves modulating the coupler propagating light waves and detecting the optical output wave at the modulation frequency. However, such modulation, due to imperfections in the modulator, tends to produce amplitude modulation in the counter propagating waves and thus, in the optical output signal. This amplitude modulation may be caused directly by the modulating device, or it may be a manifestion of polarization modulation caused by the mechanical action of the modulating device upon the fiber. In any event, such amplitude modulation is disadvantageous since it distorts the optical output signal, and thus, decreases the accuracy of the rotation sensor.

SUMMARY OF THE INVENTION

The present invention solves these and other problems of the prior art by providing an all fiber optic rotation sensor in which the sensing loop and the components for guiding and processing the light are positioned or formed along a continuous, uninterrupted strand of fiber optic material. Alignment problems are thereby reduced or eliminated, and therefore, the rotation sensor of the present invention is relatively rugged and insensitive to mechanical shock, as compared to prior art sensors utilizing bulk optical components.

The rotation sensor comprises all fiber optic components, such as a fiber optic directional coupler which (a) splits the light from the source into two waves that propagate around the sensing loop in opposite directions, and (b) combines the counter propagating waves to provide an optical output signal. Proper polarization of the applied light, the counter propagating waves, and the optical output signal is established, controlled, and maintained by a fiber optic polarizer and fiber optic polarization controllers. A second fiber optic coupler is provided to couple the optical output signal from the continuous strand to a photo detector which outputs an electrical signal that is proportional to the intensity of the optical signal.

Improved operating stability and sensitivity of the rotation sensor is achieved by phase modulating the counter propagating waves and utilizing a synchronous detection system to measure the first harmonic of the optical output signal intensity. In the detection system disclosed, the amplitude of this first harmonic is proportional to the rotation rate of the loop, and thus, measurement of such first harmonic provides a direct indication of the rotation rate of the loop.

It has been found that amplitude modulation in odd harmonics of the optical output signal, caused by the phase modulator (either directly or indirectly, through polarization modulation), may be eliminated by operating the phase modulator at a specific frequency. Since the detection system utilized detects only an odd harmonic (e.g., the first harmonic), the effects of phase modulator induced amplitude modulation may be eliminated by operating at such frequency. This eliminates a significant source of error in rotation sensing, and thereby increases the accuracy of the rotation sensor.

While the detection system utilized in the present invention significantly improves rotation sensing accuracy, it has been found that other sources of error in rotation sensing can limit the effectiveness of the detection system. One such source of error is caused by ambient magnetic fields, such as the earth's magnetic field. These ambient magnetic fields induce a phase difference between the counter-propagating waves, via the Faraday effect, which can affect the intensity of the optical output signal. In the present invention, the effects of ambient magnetic fields are reduced or eliminated by placing the rotation sensor in a housing, comprised of material having a relatively high magnetic permeability, to effectively shield the rotation sensor from the magnetic environment.

The present invention utilizes an optical isolator to prevent the optical output signal from returning to the light source. Advantageously, use of this optical isolator eliminates the need for a coupler to couple the optical output signal from the continuous fiber strand. Elimination of this coupler reduces system losses substantially, and thereby increases the intensity of the optical output signal at the detector.

In the embodiment described herein, the effects of backscattering are reduced by utilizing a second phase modulator to modulate the light applied to the fiber to reduce the coherence between backscattered light and the counter propagating waves. Alternatively, such backscatter effects may be reduced by utilizing a light source having a relatively short coherence length.

BRIEF DESCRIPTION OF THE DRAWINGS

These and other advantages of the present invention are best understood with reference to the drawings in which:

FIG. 11 is a simplified schematic drawing of the loop portion of the rotation sensor of FIG. 1, for illustrating the effect of the earth's magnetic field on the counterpropagating waves;

FIG. 12 is a schematic drawing of a housing for enclosing the sensing loop to shield it from ambient magnetic fields;

FIG. 14 is a schematic diagram of the light source and optical isolator showing the effect of the isolator upon light propagating from the source towards the sensing loop;

FIG. 15 is a schematic diagram, similar to that of FIG. 14, showing the effect of the optical isolator on the optical output signal as it returns from the loop and propagates twoards the source;

DETAILED DESCRIPTION OF THE PREFERRED EMBODIMENT

Figure 1:
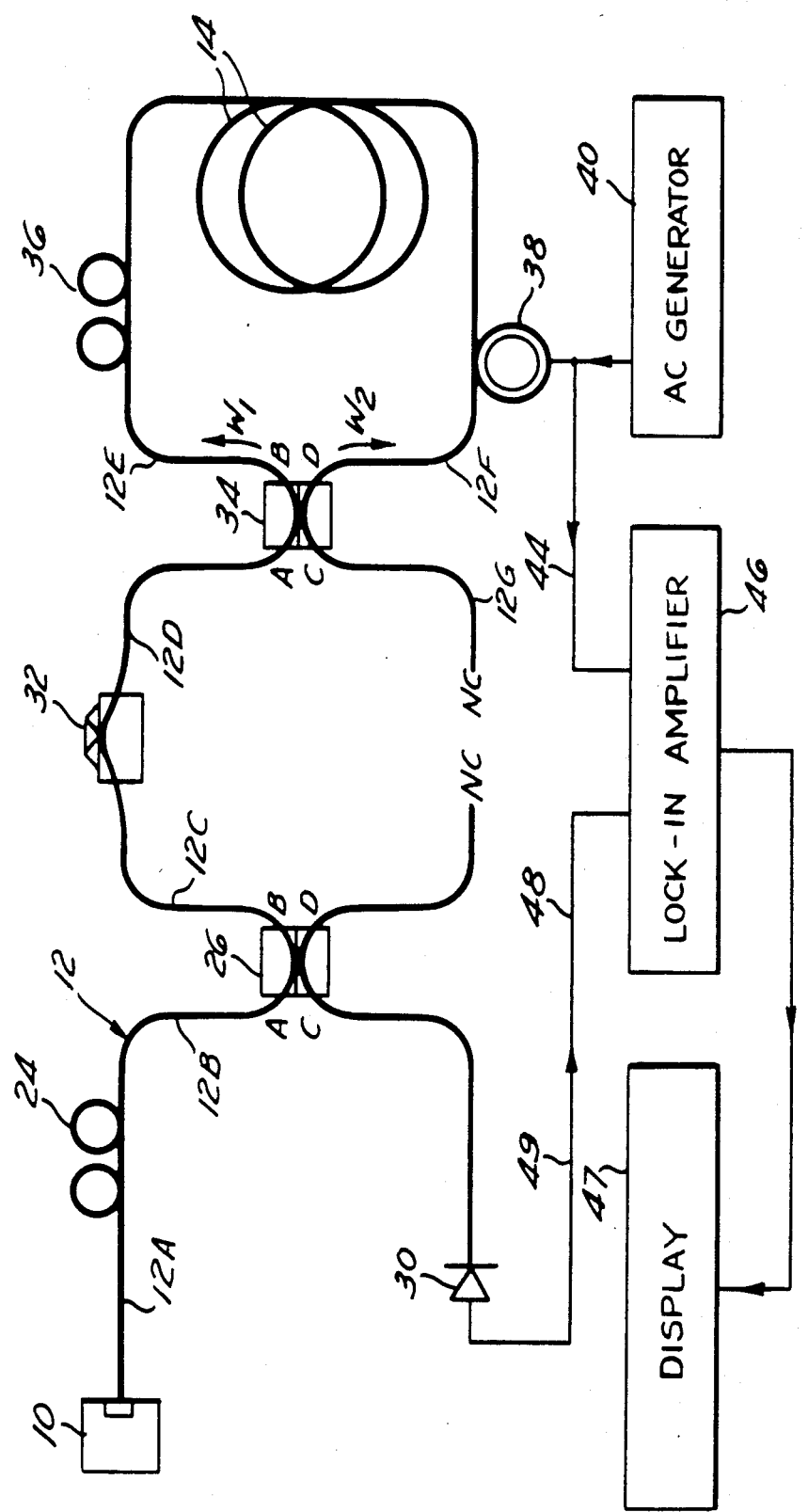
FIG. 1 is a schematic drawing of the rotation sensor of the present invention showing the fiber optic components positioned along a continuous, uninterrupted strand of fiber optic material, and further showing the signal generator, photo detector, lock-in amplifier, and display associated with the detection system.

As shown in FIG. 1, the rotation sensor of the present invention comprises a light source 10 for introducing light into a continuous length or strand of optical fiber 12, a portion of which is wound into a sensing loop 14. As used herein, the reference numeral 12 designates generally the entire continuous strand of optical fiber, while the numeral 12 with letter suffixes (A, B, C, etc.) designates portions of the optical fiber 12.

In the embodiment shown, the light source 10 comprises a galuim arsenide (GaAs) laser which produces light having a wave length on the order of 0.82 microns. By way of specific example, the light source 10 may comprise a model GO-DIP laser diode, commercially available from General Optronics Corp., 3005 Hadley Rd., South Plainfield, New Jersey. The fiber optic strands, such as the strand 12, are preferably single mode fibers having, for example, an outer diameter of 80 microns and a core diameter of 4 microns. The loop 14 comprises a plurality of turns of the fiber 12, wrapped about a spool or other suitable support (not shown). By way of specific example, the loop 14 may have approximately 1000 turns of fiber wound on a form having a diameter of 14 centimeters.

Preferably, the loop 14 is wound symmetrically, starting from the center, so that symmetrical points in the loop 14 are in proximity. It is believed that this reduces the environmental sensitivity of the rotation sensor, since such symmetry causes time varying temperature and pressure gardients to have a similar effect on both of the counterpropagating waves.

Light from the source 10 is optically coupled to one end of the fiber 12 by butting the fiber 12 against the light source 10. Various components for guiding and processing the light are positioned or formed at various locations along the continuous strand 12. For the purpose of describing the relative locations of these components, the continuous fiber 12 will be described as being divided into seven portions, labeled 12A through 12G, respectively, with the portion 12A through 12E being on the side of the loop 14 that is coupled to the source 10, and the portions 12F and 12G being on the opposite side of the loop 14.

Adjacent to the light source 10, between the fiber portions 12A and 12B is a polarization controller 24. A type of polarization controller suitable for use as the controller 24 is described in detail in co-pending patent application Ser. No. 183,975 filed Sept. 4, 1980, entitled "Fiber Optic Polarization Converter", assigned to the assignee of the present invention, and is hereby incorporated herein by reference. A brief description of the polarization controllers 24 will be provided subsequently, however, it should be presently understood that this controller 24 permits adjustment of both the state and direction of polarization of the applied light.

The fiber 12 then passes through ports, labeled A and B, of a directional coupler 26, located between the fiber portions 12B and 12C, for coupling optical power to a second strand of optical fiber 28 which passes through the ports labeled C and D of the coupler 26, the port C being on the same side of the coupler as the port A, and the port D being on the same side of the coupler as the port B. The end of the fiber 28 extending from the port D terminates non-reflectively at the point labeled "NC" (for "not connected") while the end of the fiber 28 extending from the port C is optically coupled to a photodetector 30. By way of specific example, the photo detector 30 may comprise a standard, reverse biased, silicon, PIN-type, photo diode. The coupler 24 is described in detail in co-pending patent application Ser. No. 300,955 filed Sept. 10, 1981 entitled Fiber Optic Directional Coupler, which is a continuation in part of patent application Ser. No. 139,511, filed Apr. 11, 1980 entitled Fiber Optic Directional Coupler, both of said patent applications being assigned to the assignee of the present invention. These copending patent applications are hereby incorporated by reference herein.

The fiber portion 12C, extending from the port B of the coupler 26 passes through a polarizer 32, located between the portions 12C and 12D. The polarizer 32 permits passage of light in one of the polarization modes of the fiber 12, while preventing passage of light in the other polarization mode. Preferably, the polarization controller 24 is utilized to adjust the polarization of the applied light so that such polarization is substantially the same as that passed by the polarizer 32. This reduces loss of optical power as the applied light propagates through the polarizer. A preferred type of polarizer for the use in the present invention is described in detail in co-pending patent application Ser. No. 195,934, filed Oct. 10, 1980, entitled "Polarizer and Method", assigned to the assignee of the present invention, and is hereby incorporated by reference herein.

After passing through the polarizer 32, the fiber 12 passes through ports, labeled A and B, of a directional coupler 34, located between the fiber portions 12D and 12E. This coupler 34 is preferably of the same type as described above in reference to the coupler 26. The fiber 12 is then wound into the loop 14, with a polarization controller 36 located between the loop 14 and fiber portion 12F. This polarization controller 36 may be of the type discussed in reference to the controller 24, and is utilized to adjust the polarization of the waves counterpropagating through the loop 14 so that the optical output signal, formed by superposition of these waves, has a polarization which will be efficiently passed, with minimal optical power loss, by the polarizer 32. Thus, by utilizing both the polarization controllers 24, 36, the polarization of the light propagating through the fiber 12 may be adjusted for maximum optical power.

A modulator 38, driven by an AC generator 40, and connected thereto by a line 39, is mounted on the fiber 12, between the loop 14 and the fiber portion 12F. This modulator 38 comprises a PZT cylinder, around which the fiber 12 is wrapped. The fiber 12 is bonded to the cylinder so that when it expands radially in response to the modulating signal from the generator 40, it stretches the fiber 12. An alternative type of modulator (not shown), suitable for use with the present invention, comprises a PZT cylinder which longitudinally stretches four segments of the fiber 12 bonded to short lengths of capillary tubing at the ends of the cylinder. Those skilled in the art will recognize that this alternative type of modulator may impart a lesser degree of polarization modulation to the propagating optical signal than the modulator 38, however, it will be seen subsequently that the modulator 38 may be operated at a frequency which eliminates the undesirable effects of polarization modulation. Thus, either type of modulator is suitable for use in the present invention.

The fiber 12 then passes through ports, labeled C and D of the coupler 34, with the fiber portion 12F extending from the port D and the fiber portion 12G extending from the port C. Fiber portion 12G terminates non-reflectively at a point labeled "NC" (for "not connected"). The output signal from the AC generator 40 is supplied on a line 44 to a lock-in amplifier 46, which also is connected to receive the output of the photodetector 30 by a line 48. This signal to the amplifier 46 provides a reference signal for enabling the amplifier 46 to synchronously detect the detector output signal at the modulation frequency. Thus, the amplifier 46 effectively provides a band pass filter at the fundamental frequency (i.e., first harmonic) of the modulator 38, blocking all other harmonics of this frequency. It will be seen below that the magnitude of this first harmonic component of the detector output signal is proportional, through an operating range, to the rotation rate of the loop 14. The amplifier 46 outputs a signal, which is proportional to this first harmonic component, and thus provides a direct indication of the rotation rate, which may be visually displayed on a display panel 47 by supplying the amplifier output signal to the display 47 on a line 49.

The Couplers 26 and 34

Figure 2:
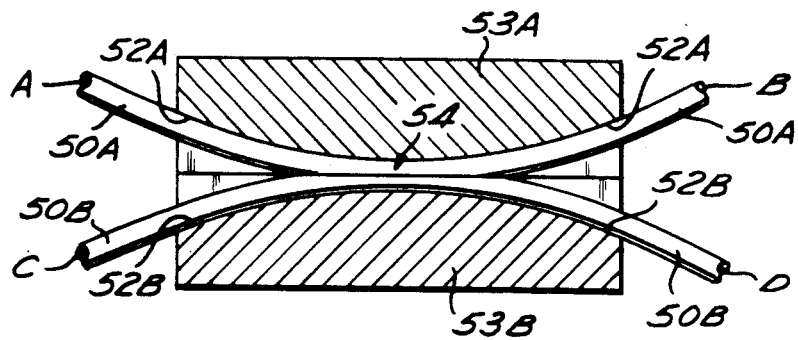
FIG. 2 is a sectional view of one embodiment of a fiber optic directional coupler for use in the rotation sensor of FIG. 1.

A preferred fiber optic directional coupler for use as the couplers 26 and 34 in the rotation sensor or gyroscope of the present invention is illustrated in FIG. 2. The coupler comprises two optical fiber strands, labeled 50A, 50B in FIG. 2, of a single mode fiber optic material having a portion of the cladding removed from one side thereof. The two strands 50A, 50B are mounted in respective arcuate slots 52A, 52B, formed in respective blocks 53A, 53B. The strands 50A, 50B are positioned with the portions of the strands where the cladding has been removed in close spaced relationship, to form a region of interaction 54, in which the light is transferred between the core portions of the strands. The amount of material removed is such that the core portion of each strand 50 is within the evanescent field of the other. The center-to-center spacing between strands 50 at the center of the coupler is typically less than about 2–3 core diameters.

It is important to note that the light transferred between the strands 50 at the region of interaction 54 is directional. That is, substantially all of the light applied to input Port A is delivered to the output Ports B and D, without contra-directional coupling to Port C. Likewise, substantially all of the light applied to input Port C is delivered to the output Ports B and D. Further, this directivity is symmetrical. Thus, light supplied to either input Port B or input Port D is delivered to the output Ports A and C. Moreover, the coupler is essentially non-discriminatory with respect to polarizations, and thus, preserves the polarization of the coupled light. Thus, for example, if a light beam having a vertical polarization is input to Port A, the light coupled from Port A to Port D, as well as the light passing straight through from Port A to Port B, will remain vertically polarized.

From the foregoing, it can be seen that the coupler may function as a beam-splitter to divide the applied light into two counter-propagating waves W1, W2 (FIG. 1). Further, the coupler may additionally function to recombine the counter-propagating waves after they have traversed the loop 14 (FIG. 1).

In the embodiment shown, each of the couplers 26, 34 has a coupling efficiency of fifty percent, as this choice of coupling efficiency provides maximum optical power at the photodetector 30 (FIG. 1). As used herein, the term "coupling efficiency" is defined as the power ratio of the coupled power to the total output power, expressed as a percent. For example, referring to FIG. 2, if light is applied to Port A, the coupling efficiency would be equal to the ratio of the power at Port D to the sum of the power output at Ports B and D. Further, a coupling efficiency of 50% for the coupler 34 insures that the counterpropagateing waves W1, W2 are equal in magnitude.

The Polarizer 32

Figure 3:
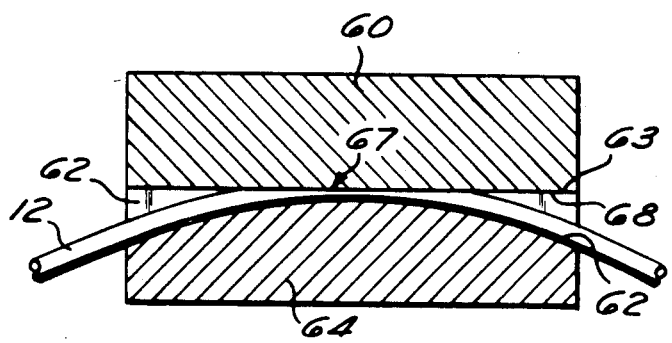
FIG. 3 is a sectional view of one embodiment of a fiber optic polarizer for use in the rotation sensor of FIG. 1.

A preferred polarizer for use in the rotation sensor of FIG. 1 is illustrated in FIG. 3. This polarizer includes a birefringent crystal 60, positioned within the evanescent field of light transmitted by the fiber 12. The fiber 12 is mounted in a slot 62 which opens to the upper face 63 of a generally rectangular quartz block 64. The slot 62 has an arcuately curved bottom wall, and the fiber is mounted in the slot 62 so that it follows the contour of this bottom wall. The upper surface 63 of the block 64 is lapped to remove a portion of the cladding from the fiber 12 in a region 67. The crystal 60 is mounted on the block 64, with the lower surface 68 of the crystal facing the upper surface 63 of the block 64, to position the crystal 60 within the evanescent field of the fiber 12.

The relative indices of refraction of the fiber 12 and the birefringent material 60 are selected so that the wave velocity of the desired polarization mode is greater in the birefringent crystal 60 than in the fiber 12, while the wave velocity of an undesired polarization mode is greater in the fiber 12 than in the birefringent crystal 60. The light of the desired polarization mode remains guided by the core portion of the fiber 12, whereas light of the undesired polarization mode is coupled from the fiber 12 to the birefringent crystal 60. Thus, the polarizer 32 permits passage of light in one polarization mode, while preventing passage of light in the other polarization mode. As previously indicated, the polarization controllers 24, 36 (FIG. 1) may be utilized to adjust the polarizations of the applied light and optical output signal, respectively, so that optical power loss through the polarizer is minimized.

The Polarization Controllers 24, 36

Figure 4:
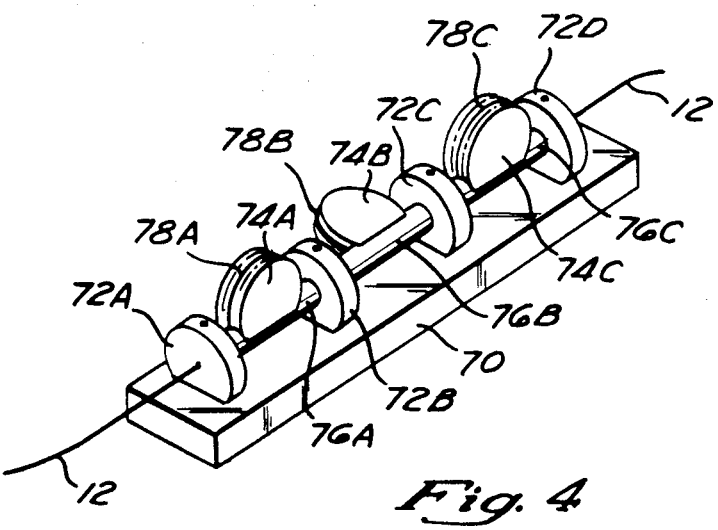
FIG. 4 is a perspective view of one embodiment of a fiber optic polarization controller for use in the rotation sensor of FIG. 1.

One type of polarization controller suitable for use in the rotation sensor of FIG. 1 is illustrated in FIG. 4. The controller includes a base 70 on which a plurality of upright blocks 72A through 72D are mounted. Between adjacent ones of the block 72, spools 74A through 74C are tangentially mounted on shafts 76A through 76C, respectively. The shafts 76 are axially aligned with each other, and are rotatably mounted between the blocks 72. The spools 74 are generally cylindrical and are positioned tangentially to the shafts 76, with the axes of the spools 74 perpendicular to the axes of the shafts 76. The strand 12 extends through axial bores in the shafts 76 and is wrapped about each of the spools 74 to form three coils 78A through 78C. The radii of the coil 78 are such that the fiber 12 is stressed to form a birefringent medium in each of the coils 78. The three coils 78A throug 78C may be rotated independently of each other about the axes of the shafts 74A through 74C, respectively, to adjust the birefringence of the fiber 12 and, thus, control the polarization of the light passing through the fiber 12.

The diameter and number of turns in the coil 78 are such that the outer coils 78A and C provide a spatial delay of one-quarter wavelength, while the central coil 78D provides a spatial delay of one-half wavelength. The quarter wavelength coils 78A and C control the elipticity of the polarization, and the half wavelength coil 78B controls the direction of polarization. This provides a full range of adjustment of the polarization of the light propagating through the fiber 12. It will be understood, however, that the polarization controller may be modified to provide only the two quarter wave coils 78A and C, since the direction of polarization (otherwise provided by the central coil 78B) may be controlled indirectly through proper adjustment of the elipticity of polarization by means of the two quarter wave coils 78A and C. Accordingly, the polarization controllers 24 and 36 are shown in FIG. 1 as including only the two quarter wave coils 78A and C. Since this configuration reduces the overall size of the controllers 24-36, it may be advantageous for certain applications of the present invention involving space limitations.

Thus, the polarization controllers 24 and 36 provide means for establishing, maintaining and controlling the polarization of both the applied light and the counter-propagating waves.

Operation Without Phase Modulation or Polarization Control

Figure 5:
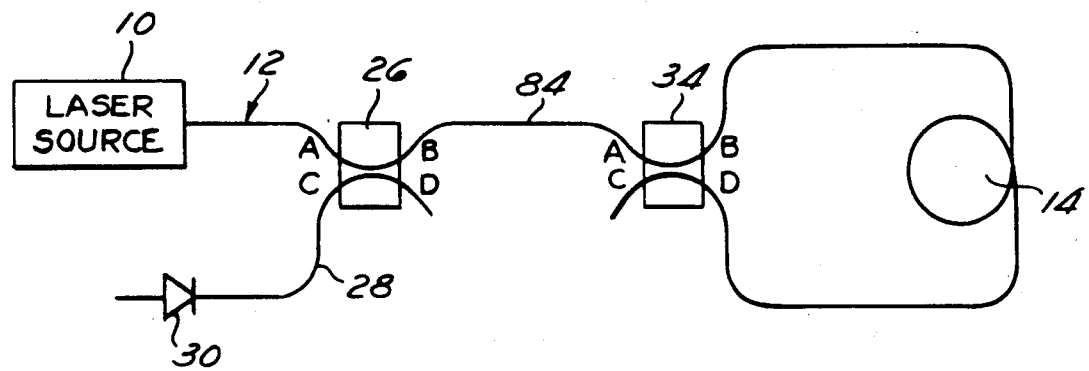
FIG. 5 is a schematic diagram of the rotation sensor of FIG. 1 with the polarizer, polarization controllers, and phase modulator removed therefrom.

In order to fully understand the function and importance of the polarizer 32 (FIG. 1) and phase modulator 38, the operation of the rotation sensor will first be described as if these components had been removed from the system. Accordingly, FIG. 5 shows the rotation sensor of FIG. 1, in schematic block diagram form, with the modulator 38, polarizer 32, and associated components removed therefrom.

Light is coupled from the laser source 10 to the fiber 12 for propagation there through. The light enters Port A of the coupler 26, where a portion of the light is lost through Port D. The remaining portion of the light propagates from Port B to Port A of the coupler 34, where it is split into two counter-propagating waves W1, W2 of equal amplitude. The wave W1 propagates from the Port B in a clockwise direction about the loop 14, while the wave W2 propagates from Port D in a counter-clockwise direction around the loop 14. After the waves W1, W2 have traversed the loop 14, they are recombined by the coupler 34 to form a continuous wave optical output signal, which propagates from Port A of the coupler 34 to Port B of the coupler 26. A portion of the optical output signal is coupled from Port B to Port C of the coupler 26 for propagation along the fiber 28 to the photodetector 30. This photodetector 30 outputs an electrical signal which is proportional to the intensity of the light impressed thereon by the optical output signal.

The intensity of the optical output signal will vary in accordance with the amount and type (i.e., constructive or destructive) of interference between the waves W1, W2 when they are recombined or super-posed at the coupler 34. Ignoring, for the moment, the effects of fiber birefringence, the waves W1, W2 travel the same optical path around the loop 14. Thus, assuming the loop 14 is at rest, when the waves W1, W2 are recombined at the coupler 34, they will interfere constructively, with no phase difference therebetween, and the intensity of the optical output signal will be at a maximum. However, when the loop 14 is rotated, the counter-propagating waves W1, W2 will be shifted in phase, in accordance with the Sagnac effect, so that when they are superposed at the coupler 34, they destructively interfere to reduce the intensity of the optical output signal. Such Sagnac phase difference between the waves W1, W2, caused by rotation of the loop 14, is defined by the following relationship:

$$\phi_{ws} = (8\pi NA/\lambda c)\Omega \qquad (1)$$

Where A is the area bounded by the loop 14 of optical fiber, N is the number of turns of the optical fiber about the area A, $\Omega$ is the angular velocity of the loop about an axis which is perpendicular to the plane of the loop, and $\lambda$ and c are the free space values of the wave length respectively, of the light applied to the loop.

The intensity of the optical output signal ($I_T$) is a function of the Sagnac phase difference ($\phi_{ws}$) between the waves W1, W2, and is defined by the following equation:

$$I_T = I_1 + I_2 + 2\sqrt{I_1 I_2} \cos\phi_{ws} \qquad (2)$$

where $I_1$ and $I_2$ are the individual intensities of the waves W1, W2, respectively.

From equations (1) and (2) it may be seen that the intensity of optical output signal is a function of the rotation rate ($\Omega$). Thus, an indication of such rotation rate may be obtained by measuring the intensity of the optical output signal, utilizing the detector 30.

Figure 6:
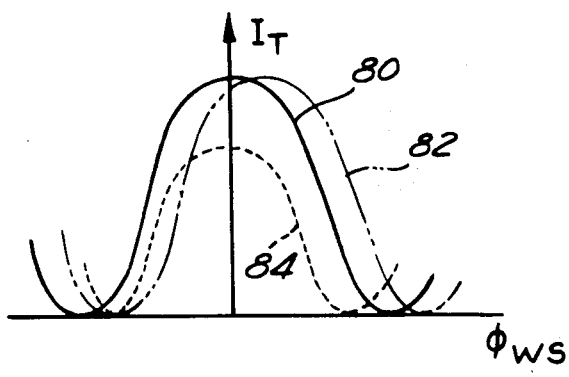
FIG. 6 is a graph of the intensity of the optical output signal, as measured by the photo detector, as a function of the rotationally induced SAGNAC phase difference, illustrating the effects of birefringence induced phase differences and birefringence induced amplitude fluctuations.

FIG. 6 shows a curve 80, which illustrates this relationship between the intensity of the optical output signal ($I_T$) and the Sagnac phase difference ($\phi_{ws}$) between the counter-propagating waves W1, W2. The curve 80 has the shape of a cosine curve, and the intensity of the optical output signal is at a maximum when the Sagnac phase difference ($\phi_{ws}$) is zero. Where the phase difference between counter-propagating waves W1, W2 is caused entirely by rotation of the loop 14, the curve 80 will vary symmetrically about the vertical axis. However, unless completely unpolarized light is utilized, as discussed in copending patent application Ser. No. 288,212, filed July 29, 1981, assigned to the assignee of the present invention, and hereby incorporated by reference herein, an additional, non-reciprocal, phase difference between the counter-propagating waves W1, W2 may be caused by the residual birefringence of the optical fiber 12. Birefringence-induced phase differences occur because fiber birefringence tends to cause each of the two polarization modes of the single mode fiber 12 to propagate light at a different velocity. This creates a non-rotationally induced phase difference between the waves W1, W2, which causes the waves W1, W2 to interfere in a manner that distorts or shifts the curve 80 of FIG. 6, for example, as illustrated by the curve 82, shown in phantom lines. Such birefringence-induced, non-reciprocal phase difference is indistinguishable from a rotationally-induced Sagnac phase difference, and is dependent on environmental factors which vary fiber birefringence, such as temperature and pressure. Thus, fiber birefringence is the cause of a major source of error in fiber optic rotation sensors.

Operation with the Polarizer 32

The problem of non-reciprocal operation due to fiber birefringence is solved in the rotation sensor of the present invention by means of the polarizer 32 (FIG. 1) which, as discussed above, permits utilization of only a single polarization mode. Thus, when the polarizer 32 is introduced into the system, at the point designated by the reference numeral 84 in FIG. 5, light input through the polarizer 32 propagates into the loop 14 in the desired polarization mode. Further, when the counter-propagating waves are recombined to form the optical output signal, any light that is not of the same polarization as the light applied to the loop is prevented from reaching the photo detector 30, since the optical output signal as it travels from port A of coupler 34 to port B of coupler 26, also passes through the polarizer 32. Thus, the optical output signal, when it reaches the detector 30, will have precisely the same polarization as the light applied to the loop. Therefore, by passing the input light and optical output signal through the same polarizer 32, only a single optical path is utilized, thereby eliminating the problem of birefringence-induced phase difference. Further, it should be noted that the polarization controllers 24, 36 (FIG. 1) may be used to adjust the polarization of the applied light, and optical output signal, respectively, to reduce optical power loss at the polarizer 32, and thus, maximize the signal intensity at the detector 30.

Operation with the Phase Modulator 38

Referring again to FIG. 6, it will be seen that, because the curve 80 is a cosine function, the intensity of the optical output signal is nonlinear for small phase differences ($\phi_{ws}$) between the waves W1, W2. Further, the optical output signal intensity is relatively insensitive to changes in phase difference, for small values of $\phi_{ws}$. Such nonlinearity and insensitivity makes difficult to transform the optical intensity ($I_T$) measured by detector 30 into a signal indicative of the rate of rotation $\Omega$ (equation 1) of the loop 14.

Further, although birefringence induced phase differences between the waves W1, W2 are eliminated, as discussed above, by use of the polarizer 32, cross coupling between polarization modes caused by fiber birefringence reduces the optical intensity of the optical output signal, since such cross coupled light is prevented from reaching the photodetector 30 by the polarizer 32. Thus, changes in fiber birefringence cause the amplitude of the curve 80 of FIG. 6 to vary, for example, as illustrated by the curve 84. It will be understood that curves 80, 82, 84 of FIG. 6 are not drawn to scale.

Figure 7:
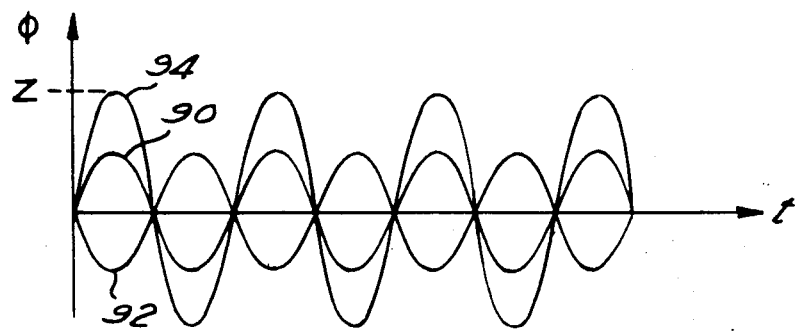
FIG. 7 is a graph of phase difference as a function of time showing the phase modulation of each of the counterpropagating waves and the phase difference between the counterpropagating waves.

The foregoing problems are solved in the rotation sensor of the present invention by means of a synchronous detection system utilizing the phase modulator 38, signal generator 40 and lock-in amplifier 46, shown in FIG. 1. Referring to FIG. 7, the phase modulator 38 modulates the phase of each of the propagating waves W1, W2 at the frequency of the signal generator 40. However, as may be seen from FIG. 1, the phase modulator 38 is located at one end of the loop 14. Thus, the modulation of the wave W1 is not necessarily in phase with the modulation of the wave W2. Indeed, it is necessary for proper operation of this synchronous detection system that the modulation of the waves W1, W2 be out of phase. Referring to FIG. 7, it is preferable that the modulation of the wave W1, represented by the sinusoidal curve 90, be 180 degrees out of phase with the modulation of the wave W2, represented by the curve 92. Use of a modulation frequency which provides such 180 degree phase difference between the modulation of the wave W1 relative to that of W2 is particularly advantageous in that it eliminates modulator induced amplitude modulation in the optical output signal measured by the detector 30. This modulation frequency ($f_m$) may be calculated using the following equation:

$$f_m = (c/2n_{eq}L) \qquad (3)$$

where L is the differential fiber length, between the coupler 34 and modulator 38, for the counter propagating waves W1, W2 (i.e., the distance, measured along the fiber, between the modulator 38 and a symmetrical point on the other side of the loop 14); $n_{eq}$ is the equivalent refractive index for the single mode fiber 12, and c is the free space velocity of the light applied to the loop 14.

At this modulation frequency ($f_m$), the phase difference (100 $_{wm}$) between the counter propagating waves W1, W2, to phase modulation of these waves in accordance with the curves 90 and 92, is illustrated by the sinusoidal curve 94 in FIG. 7. This modulation of the phase difference between the waves W1, W2 will modulate the intensity ($I_T$) of the optical output signal in accordance with the curve 80 of FIG. 6, since such phase modulation $\phi_{wm}$ is indistinguishable from rotationally induced Sagnac phase differences $\phi_{ws}$.

Figure 8:
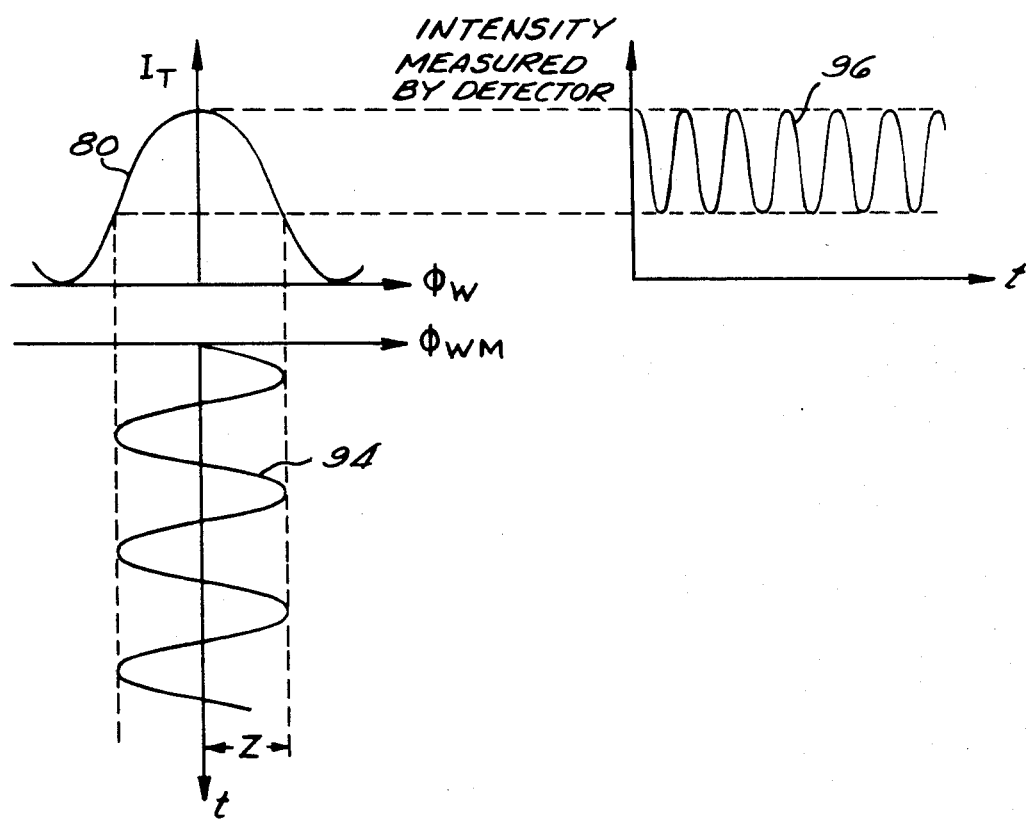
FIG. 8 is a schematic drawing illustrating the effect of the phase modulation upon the intensity of the optical output signal, as measured by the detector, when the loop is at rest.
Figure 9:
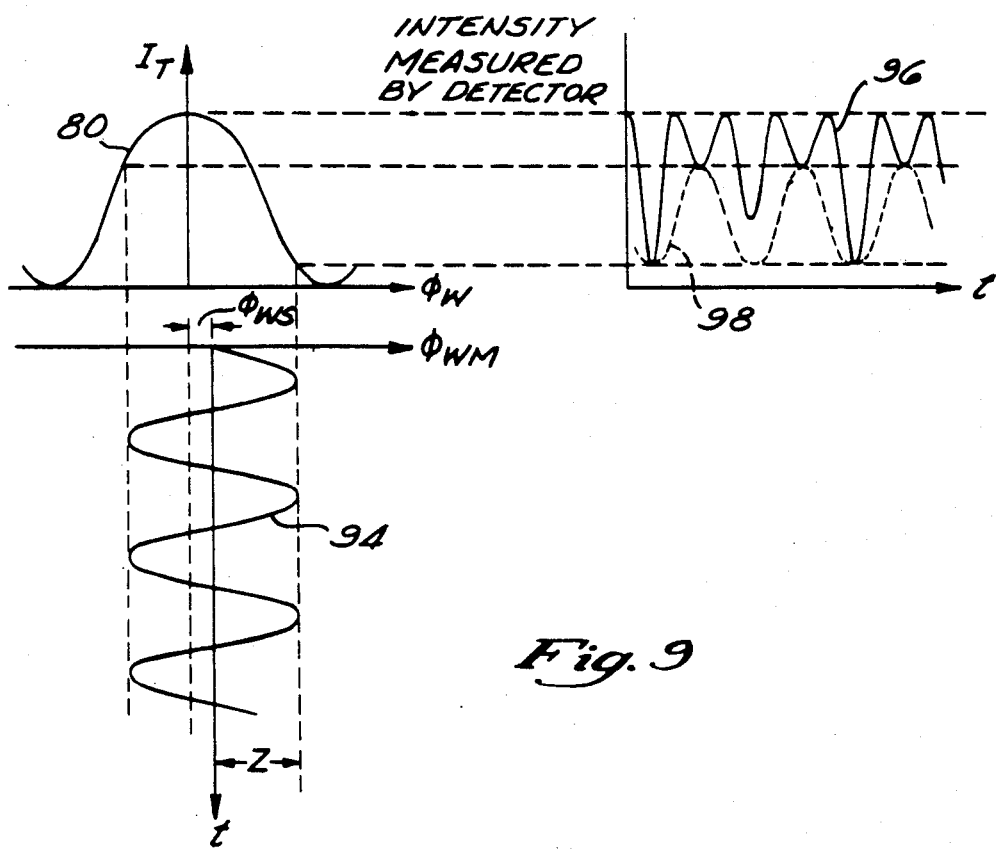
FIG. 9 is schematic drawing showing the effect of the phase modulation upon the intensity of the optical output signal, as measured by the detector, when the loop is rotating.

The foregoing may be understood more fully through reference to FIGS. 8 and 9 which graphically illustrate the effect of (a) the phase modulation $\phi_{wm}$, defined by the curve 94 of FIG. 7, and (b) the Sagnac phase difference $\phi_{ws}$, upon the intensity ($I_T$) of the optical output signal, represented by the curve 80 of FIG. 6. However, before proceeding with a discussion of FIGS. 7 and 8, it should first be understood that the intensity ($I_T$) of the modulated optical output signal is a function of the total phase difference between the waves W1, W2. Further, such total phase difference is comprised of both the rotationally induced Sagnac phase difference $\phi_{ws}$ and the time varying modulation induced phase difference $\phi_{wm}$.

Thus, the total phase difference $\phi_w$ between the waves W1, W2 may be expressed as follows:

$$\phi_w = \phi_{ws} + \phi_{wm} \tag{4}$$

Accordingly, since the effects of the modulation induced phase difference $\phi_{wm}$, well as the rotationally induced phase difference $\phi_{ws}$ will be considered in reference to FIGS. 8 and 9, the horizontal axis for the curve 80 has been relabeled as $\phi_w$ to indicate that the total phase difference is being considered, rather than only the rotationally induced phase difference, as in FIG. 6.

Referring now to FIG. 8, the effect of the phase modulation $\phi_{wm}$ (curve 94) upon the intensity $I_T$ of the optical signal (curve 80) will be discussed.

In FIG. 8, it is assumed that the loop 14 is at rest, and thus, the optical signal is not affected by the Sagnac effect. Specifically, it may be seen that the modulation induced phase difference curve 94 varies the optical output signal in accordance with the curve 80, symmetrically about its vertical axis, so that the optical intensity measured by the detector 30 varies periodically at a frequency equal to the second harmonic of the modulating frequency, as shown by the curve 96. Since, as discussed above, the lock-in amplifier 46 is enabled by the signal generator 40 (FIG. 1) to synchronously detect the detector output signal at the modulation frequency (i.e., first harmonic) of the modulator 38, and since the detector output signal is at the second harmonic of the modulation frequency as shown by the curve 96, the amplifier output signal will be zero and the display 47 will indicate a rotation rate of zero. It should be noted that, even if birefringence induced amplitude fluctuations occur in the optical output signal, as discussed in reference to the curve 84 of FIG. 6, the curve 96 of FIG. 8 will remain at a second harmonic frequency. Thus, such birefringence induced amplitude fluctuations will not affect the amplifier 46 output signal. The dectection system of the present invention therefore, provides a substantially stable operating point that is insensitive to changes in birefringence, particularly when the loop 14 is at rest.

When the loop 14 is rotated, the counter propagating waves W1, W2 are shifted in phase, as discussed above, in accordance with the Sagnac effect. The Sagnac phase shift provides a phase difference $\phi_{ws}$ which adds to the phase difference $\phi_{wm}$ created modulator 38, so that the entire curve 94 is translated in phase from the position shown in FIG. 8, by an amount equal to $\phi_{ws}$, to the position shown in FIG. 9. This causes the optical output signal to vary non-symmetrically in accordance with the curve 80, thereby harmonically distorting this signal as shown by the curve 96 of FIG. 9, so that it includes a component at the fundamental (i.e., first harmonic) frequency of the modulator 38, as illustrated in phantom lines by the sinusoidal curve 98. It will be seen subsequently that the RMS value of this sinusoidal curve 98 is proportional to the sine of the rotationally induced, Sagnac phase difference $\phi_{ws}$. Since the amplifier 46 synchronously detects signals having the fundamental frequency of the modulator 38, the amplifier 46 will output a signal to the display 47 that is proportional to the RMS value of the curve 98 to indicate the rotation rate of the loop.

The drawings of FIG. 9 illustrate the intensity wave form of the optical output signal for one direction of rotation (e.g., clockwise) of the loop 14. However, it will be understood that, if the loop 14 is rotated in the opposite direction (e.g., counter-clockwise) at an equal velocity, the intensity wave form 96 of the optical output signal will be exactly the same as illustrated in FIG. 9, except that it will be translated so that the curve 98 is shifted 180 degrees from the position shown in FIG. 9. The lock-in amplifier 46 detects this 180 degree phase difference for the curve 98, by comprising its phase with the phase of the reference signal from the signal generator 40, to determine whether the rotation of the loop is clockwise or counter-clockwise. Depending on the direction of rotation, the amplifier 46 outputs either a positive or negative signal to the display 47. However, regardless of the direction of rotation, the magnitude of the signal is the same for equal rates of rotation of the loop 14.

Figure 10:
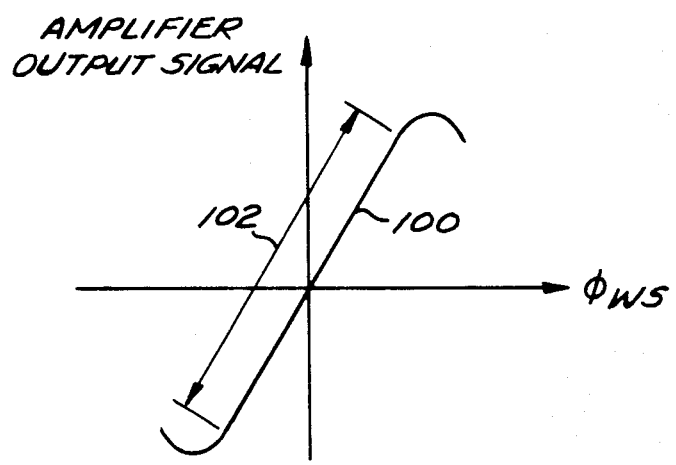
FIG. 10 is a graph of the amplifier output signal as a function of the rotationally induced SAGNAC phase difference, illustrating an operating range for the rotation sensor of FIG. 1.

The wave form of the amplifier output signal is shown in FIG. 10 as the curve 100. It will be seen that this curve 100 is sinusoidal and varies positively or negatively from zero rotation rate depending on whether the rotation of the loop 14 is clockwise or counter clockwise. Further, the curve 100 has a substantially linear portion 102 which varies symmetrically about the origin and provides a relatively wide operating range for measuring rotation. Moreover, the slope of the curve 100 provides excellent sensitivity throughout its linear operating range 102.

Thus, by utilizing the synchronous detection system, the above described problems of non-linearity, insensitivity, and birefringence induced amplitude fluctuations are reduced or eliminated.

A further advantage of this detection system relates to the fact that state of the art phase modulators, such as the modulator 38, induce amplitude modulation in the optical output signal, either directly, or indirectly through polarization modulation. However, it will be recalled from the discussion in reference to equation 3 that, by operating at a specific frequency at which the phase difference between the modulation of the waves W1 and W2 is 180 degrees, the odd harmonic frequency components of the amplitude modulation, that are induced in each of the counter propagating waves, W1, W2 by the modulator 38, cancel each other when the waves are superposed to form the optical output signal. Thus, since the above described detection system detects only an odd harmonic (i.e., the fundamental frequency) of the optical output signal, the effects of amplitude modulation are eliminated. Therefore, by operating at the specific frequency defined by equation 3, and detecting only an odd harmonic of the optical output signal, the rotation sensor of the present invention may operate independently of modulator induced amplitude and polarization modulation.

A further benefit of operating at the specific frequency is that even harmonics of the phase modulation, induced by the modulator 38 in each of the counter propagating phase W1, W2, cancel when these waves are superposed to form the optical output signal. Since these even harmonics may produce spurious odd harmonics in the optical output signal which might otherwise be detected by the detection system, their elimination improves the accuracy of rotation sensing.

In addition to operating the phase modulator 38 at the frequency defined by equation 3, it is also preferable to adjust the magnitude of the phase modulation so that the amplitude of the detected first harmonic of the optical output signal intensity is maximized, since this provides improved rotation sensing sensitivity and accuracy. It has been found that the first harmonic of the optical output signal intensity is at the maximum, for a given rotation rate, when the amplitude of the modulator induced phase difference between the waves W1, W2, indicated by the dimension labeled z in FIG. 7, 8 and 9, is 1.84 radians. This may be understood more fully through reference to the following equation for the total intensity ($I_T$) of two superposed waves having individual intensities of $I_1$ and $I_2$, respectively, with a phase difference $\phi_w$ therebetween.

$$I_T = I_1 + I_2 + 2\sqrt{I_1 I_2} \cos\phi_w \qquad (5)$$

where:

$$\phi_w = \phi_{ws} + \phi_{wm} \qquad (6)$$

and $$\phi_{wm} = z \sin(2\pi f_m t) \qquad (7)$$

Thus, $$\phi_w = \phi_{ws} + z \sin(2\pi f_m t) \qquad (8)$$

the Fourier expansion of cosine $\phi_w$ is:

$$\cos\phi_w = \cos\phi_{ws}\left\{ J_0(z) + 2\sum_{n=1}^{\infty} J_{2n}(z)\cos[2\pi(2nf_m t)] \right\} - \sin\phi_{ws}\left( 2\sum_{n=1}^{\infty} J_{2n-1}(z)\sin[2\pi(2n-1)f_m t] \right) \qquad (9)$$

where $J_n(z)$ is the $n^{th}$ Bessel function of the variable z, and z is the peak amplitude of the modulator induced phase difference between the waves W1, W2.

Therefore, detecting only the first harmonic of $I_T$ yields:

$$I_{T(1)} = 4\sqrt{I_1 I_2} J_1(z) \sin\phi_{ws} \sin(2\pi f_m t) \qquad (10)$$

Thus, the amplitude of the first harmonic of the optical output signal intensity is dependent upon the value of the first Bessel function $J_1(z)$. Since $J_1(z)$ is a maximum when z equals 1.84 radians, the amplitude of the phase modulation should preferably be selected so that the magnitude of the modulator induced phase difference (z) between the waves W1, W2 is 1.84 radians.

Reducing the Effects of Backscatter

As is well known, present state of the art optical fibers are not optically perfect, but have imperfections which cause scattering of small amounts of light. This phenomena is commonly referred to as rayleigh scattering. Although such scattering causes some light to be lost from the fiber, the amount of such loss is relatively small, and therefore, is not a major concern. The principle problem associated with rayleigh scattering relates not to scattered light which is lost, but rather, to light which is reflected so that it propagates through the fiber in a direction opposite to its original direction of propagation. This is commonly referred to as "backscattered" light. Since such backscattered light is coherent with the light comprising the counterpropagating waves, W1, W2, it can constructively or destructively interfere with such propagating waves, and thereby cause variation in the intensity of the optical output signal, as measured by the detector 30.

The portion of backscattered light from one wave which will be coherent with the counterpropagating wave is that which is scattered within a coherence length of the center of the loop 14. Thus, by reducing the coherence length of the source, the coherence between the backscattered light and the counterpropagating waves is reduced. The remaining portion of the backscattered light will be incoherent with the counterpropagating wave, and thus, the interference therebetween will vary randomly so that it is averaged. Therefore, this incoherent portion of the backscattered light will be of substantially constant intensity, and consequently, it will not cause significant variations in the intensity of the optical output signal. Accordingly, in the present invention, the effects of backscattered light are reduced by utilizing, as the light source 10, a laser having a relatively short coherence length, for example, one meter or less. By way of specific example, the light source 10 may comprise the model GO-DIP laser diode, commercially available from General Optronics Corp., as mentioned above.

An alternative method of prohibiting destructive or constructive interference between the backscattered waves and the propagating waves involves the inclusion of an additional phase modulator (not shown) in the system at the center of the fiber loop 14. This phase modulator is not synchronized with the modulator 38.

The propagating waves will pass through this additional phase modulator one time only, on their travel around the loop. For backscatter which occurs from a propagating wave before the wave reaches the additional modulator, the backscatter will not be phase modulated by this additional modulator, since neither its source propagating wave nor the backscatter itself has passed through the additional modulator.

On the other hand, for backscatter which occurs from a propagating wave after the wave passes through this additional phase modulator, the backscatter will be effectively twice phase modulated, once when the propagating wave passed through the additional phase modulator, and once when the backscatter passed through the additional modulator.

Thus, if the additional phase modulator introduces a phase shift of $\phi(t)$, the backscattered wave originating at any point except at the center of the loop 14 will have a phase shift of either zero, or $2\phi(t)$, either of which is time varying with respect to the $\phi(t)$ phase shift for the propagating wave. This time varying interference will average out over time, effectively eliminating the effects of the backscattered light.

In yet another alternative method of prohibiting destructive or constructive interference from backscattered, the additional phase modulator, not synchronized with the modulator 38, may be introduced at the output of the light source 10.

In this case, backscatter occurring at any point other than the center of the loop 14 will have a different optical path length from the light source 10 to the detector 30 than does the propagating wave from which the backscattered light originated.

Thus, the propagating wave will traverse the loop 14 one time, while the backscattered wave, and the propagating wave from which it originated, will have traversed a portion of the loop 14 twice. If this portion is not one half of the loop, the path lengths differ.

Because the path lengths differ, a propagating wave which reaches the detector 30 must have been generated at the source 10 at a different time than a backscattered wave which reaches the detector 30 simultaneously.

The phase shift introduced by the additional phase modulator at the source 10 introduces a phase shift $\phi(t)$ to the propagating wave, but a phase shift of $\phi(t+k)$ to the backscattered wave, where K is the time difference between the passage of the waves through the modulator. Since $\phi(t+k)$ is time varying with respect to $\phi(t)$, the backscattered interference will average out over time, effectively eliminating the effects of the backscatter.

Reducing the Effects of Ambient Magnetic Fields

It has been found that ambient magnetic fields, such as the earth's magnetic field, can limit the rotation sensing accuracy of the present invention by inducing a phase difference between the counter-propagating waves W1, W2. Such magnetic fields induce this phase difference by causing the respective phases of each of the two counter-propagating waves W1, W2 to be shifted in opposite directions relative to each other, causing one to lead and one to lag.

These phase shifts of the waves W1, W2 are due to those components of the ambient magnetic field having "B fields" (i.e., magnetic flux density) parallel to the direction of propagation of waves W1, W2. The magnetic field components produce a phenomenon, commonly known as the Faraday effect, which causes the direction of polarization for each wave to be roatated. This will be referred to herein as "Faraday rotation". Assuming the polarization of the light wave is expressed as the resultant sum of two circularly polarized, counter rotating components, propagating in respective polarization modes, the magnetic field may be considered to induce such Faraday rotation by retarding the propogation velocity of light in one of the polarization modes, while advancing the other by the same amount.

The polarization of a light wave may be characterized by its degree of ellipticity. If the degree of ellipticity is zero, the polarization is commonly referred to as "linear". In this state, there will be equal amounts of light in each of the modes. Similarly, if the degree of ellipticity is one, the polarization may be referred to as "circular", and all of the light will be in one of the modes. Further, if the degree of ellipticity is between zero and one, the polarization may be referred to as "elliptical" and the modes will have unequal amounts of light.

When the polarization of a wave is linear, the differential change on propagation velocity of the polarization modes, resulting from the Faraday effect, has no effect on the phase of the wave. However, when the polarization of a wave is something other than linear (i.e., elliptical or circular), the differential change in propagation velocity causes the phase of the wave to be shifted, the amount of such phase shift being dependent upon the degree of ellipticity of the polarization. This occurs because, when the polarization is circular or elliptical, there are, as mentioned above, unequal amounts of light in each of the two polarization modes, and thus, if the propagation velocity of one of the modes is advanced, while the other is retarded, the net effect will be to increase or decrease the propagation velocity of the wave, thereby causing the phase of the wave to be shifted. Assuming, for example, that the Faraday effect increases the propagation velocity for a first mode and decreases it for a second mode, and further assuming that the light in the first mode has an amplitude larger than that of the second mode, the Faraday effect will result in a leading phase shift. On the other hand, if it is assumed that the light in the second mode has a greater amplitude than the first mode, the Faraday effect will result in a lagging phase.

As indicated above, the phase shifts resulting from the Faraday effect may be eliminated by maintaining linear polarization for the waves W1, W2 as they counter-propagate through the loop 14. Unfortunately, however, this is extremely difficult to accomplish, since presently available optical fibers have residual linear birefrigence, which causes the waves W1, W2 to change their respective states of polarization as they propagate through the fiber. For example, if the waves W1, W2 are linearly polarized waves when introduced into the loop 14, such residual linear birefrigence will cause their polarization to change, e.g., to elliptical, as the waves traverse the loop 14. Thus, each wave W1, W2 will exhibit a phase shift, due to the Faraday effect, upon exiting the loop 14. Further, in the emobdiment of FIG. 1, these phase shifts are in opposite directions, and thus, they produce a phase difference between the waves W1, W2.

The foregoing may be understood more fully through reference to an example. Accordingly, there is shown in FIG. 11 the loop portion of the rotation sensor of FIG. 1 which, in order to simplify the present discussion, is illustrated as being a single turn loop, rather than a multi-turn loop. Further, the residual linear birefrigence of the fiber is assumed to be concentrated at the center of the loop 14, at the point designated by the reference numeral 117. Additionally, the earth's magnetic field (B field) is assumed to be in the plane of the loop, in the direction illustrated by the arrows 118, so that this B field is generally parallel to the fiber at the top and bottom of the loop, as viewed in FIG. 11. It will be recalled from the discussion in reference to FIG. 1 that the waves W1, W2 are linearly polarized when they enter the loop 14, and that the polarization controller 36 is adjusted to compensate for the fiber birefrigence so that the polarization of the waves W1, W2 is also linear when they exit the loop 14. Furthermore, to the extent that the fiber birefrigence is symmetrically distributed about the loop 14, as is the case in FIG. 11, the polarization of the waves W1, W2, with the controller 36 so adjusted, will be the same at any given point on the loop 14. In the present example, the birefrigence at the center of the loop 117 will be assumed to change the phase of each wave by one-quarter wavelength, so that linearly polarized light will be transformed into circularly polarized light, and vice versa. Thus, the controller 36 is adjusted to compensate for this phase change by shifting the phase an equal amount, i.e., one-quarter wavelength.

When the linearly polarized wave W1 begins its traverse of the loop 14, the birefringence of the controller 36 will change its state of polarization to e.g., right-hand circular. As this wave, W1 propagates through the top portion of the loop 14, its phase will be shifted, in accordance with the Faraday effect, due to the presence of the field 118. Upon reaching the residual birefringence at the center 117 of the loop 14, the circular polarization of the wave W1 will be transformed to a linear polarization. Since the polarization of the wave W1 remains linear through the bottom portion of the loop 14, the field 118 will have no further effect on the wave W1. Similarly, the wave W2, which intially traverses the lower portion of the loop, is not affected by the filed 118 at this lower portion, since its polarization will remain linear until it reaches the birefringence at the point 117. At the point 117, the polarization of the wave W2 is transformed to e.g., right-hand circular, and thus, as the wave W2 traverses the upper portion of the loop, its phase will be shifted, in accordance with the Faraday effect, due to the presence of the field 118. However, since the waves W1, W2 propagate in opposite directions with the same polarization through the upper portion of the loop 14, but the field 118 remains in the same direction, the respective phase shifts of the waves W1, W2 induced by the field 118 will be in opposite directions. Thus, there will be a phase difference between the waves W1, W2 when they reach the coupler 34, due to the Faraday effect. It may be seen, therefore, that ambient magnetic fields are a source of non-reciprocal behavior in fiber optic rotation sensors.

In order to eliminate rotation sensing errors produced by ambient magnetic fields through the Faraday effect, the present invention includes a housing 110, shown in FIG. 12, for shielding or isolating the rotation sensor, particularly the loop 14 and coupler 34, from such ambient fields. In th embodiment shown, the housing 110 comprises a cyclindrical tube of μ-metal which has a sufficiently high magnetic permeability to effectively shield the rotation sensor from the magnetic enviornment. The dimensions of the housing 110 may be chosen to accomodate the structural dimensions of the rotation sensor and the hostility of the magnetic enviornment. By way of specific example, the μ-metal shield may be 7 inches in diameter, 18 inches long, and 1/16th inch thick. In any case, the dimensions and materials utilized should preferably reduce the magnetic field impinging upon the fiber by an amount commensurate with the sensing accuracy of the rotation sensor. That is, the reduction in the magnetic field intensity should be sufficient so that rotation sensing accuracy is not limited by the Faraday effect produced by such field. Assuming that the magnetic enviornment is due solely to the earth's magnetic field (i.e., about 0.5 guass), the above-described embodiment of the shield will reduce the magnetic field by a factor of about 100 to about 0.005 guass, which is needed to achieve a long term stability of about 0.1 degrees/hour.

The fiber optic components of the rotation sensor, including the loop 14, may be mounted on a base plate 112, mounted within the housing 110. The ends of the housing may be closed by means of μ-metal caps 114, one of which has a suitable opening 116 for passage of the amplifier line 48 and modulator line 39 (FIG. 1).

Isolating the Source 10 From the Optical Output Signal

It will be recalled from the discussion in reference to FIG. 1 that a portion of the input light from the source 10 is coupled, by the coupler 26, to the fiber 28, where it is lost at the non-reflective termination labeled "NC". Further, when the waves W1, W2 return from the loop 14, and are combined to form an optical output signal, a portion of this signal is lost, through port C of the coupler 24. The remaining portion of the output signal progates back toward the source 10, where a portion of the optical output signal is coupled, by the coupler 26, from the fiber 12 to the fiber 28 for propagation to the photodector 30. The remaining uncoupled portion of the optical output signal, which propagates through the fiber 12 to the laser source 10, is lost. Assuming the couplers 26 and 34 have a coupling efficiency of 50%, the system losses resulting from the couplers 26, 34 are 87.5%. The coupler 26 alone accounts for 67.5% of this loss in optical power.

Figure 13:
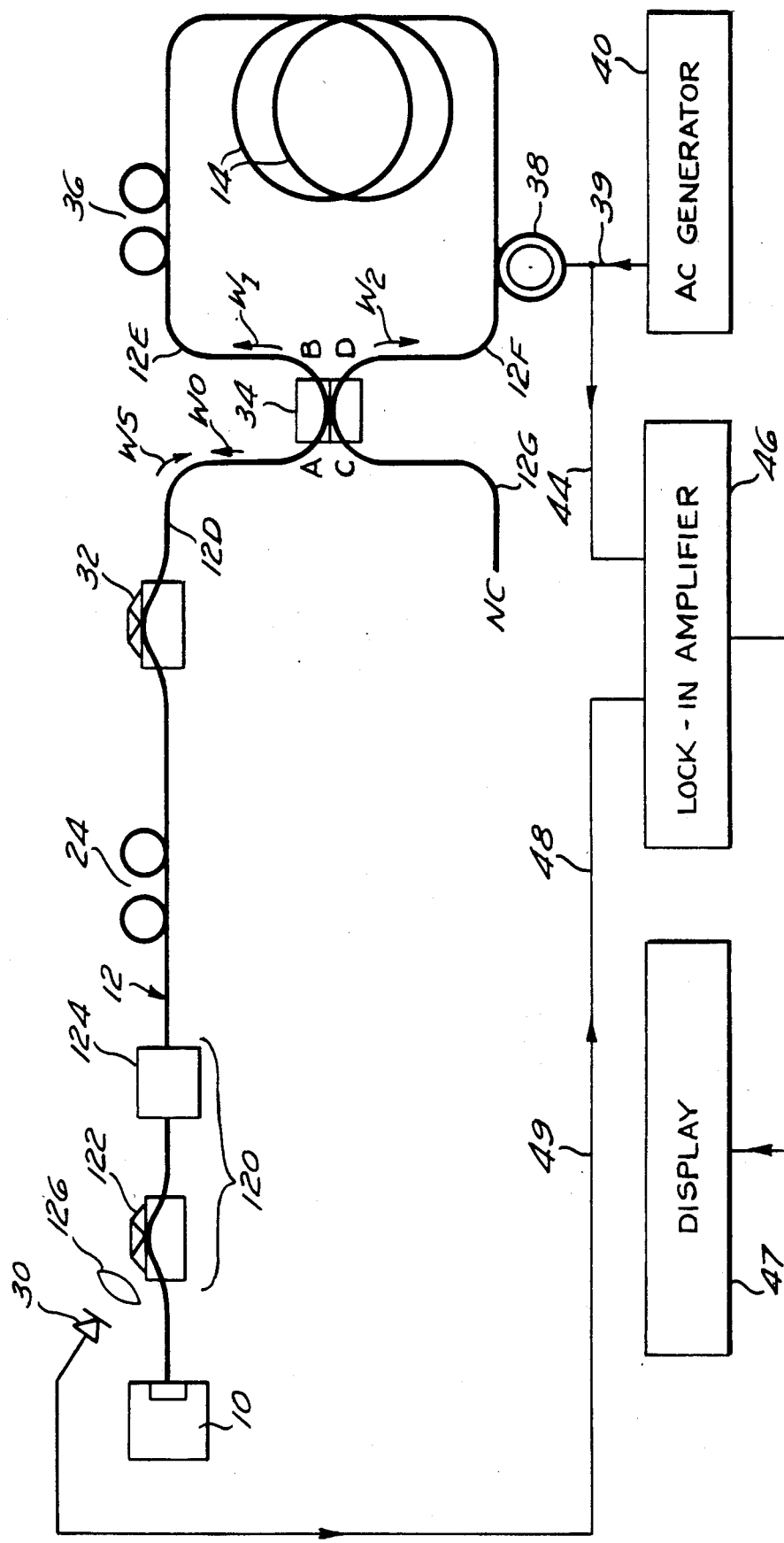
FIG. 13 is a schematic drawing of the rotation sensor of FIG. 1 with an optical isolator included to prevent the optical output signal from reaching the light source, and showing the photodetector positioned to detect the light rejected by the isolator so that a coupler is not needed to extract the optical output signal from the continuous fiber strand.

In order to reduce these system losses, the present invention includes a fiber optic isolator 120, positioned between the source 10 and polarization controller 24, as shown in FIG. 13. This isolator 120 comprises a polarizer 122 and a magneto-optic, or Faraday, rotator 124. In this embodiment, the need for the coupler 26 (FIG. 1) is eliminated by postioning the detector 30 to measure the intensity of the light rejected by the polarizer 122. This light may be focused upon the photodetector 30 by means of a lens 126.

The operation of the fiber optic isolator may be more fully understood through reference to FIGS. 14 and 15. Referring first to FIG. 14, the polarization of the light passsed by the polarizer 122 is matched to that produced by the light source 10, so that all of the source light introduced into the fiber 12 passes through the polarizer 122 to the magneto-optic rotator 24. It will be understood, however, that this polarization match may be accomplished by means of a polarization controller of the type discussed above in reference to the controllers 24, 36. For the purpose of this discusssion, it will be assumed that the light produced by the source 10 is linearly polarized in a vertical direction, and thet the polarizer 122 passes this polarization, while rejecting other polarizations. This linearly polarized light is represented in FIG. 14 by the arrows labeled WS.

AS seen from FIG. 14, the source light WS produced by the source 10 is unchanged in polarization as it proagates through the polarizer 122. However, when the light passes through the rotator 124, its direction of polarization is rotated by 45 degrees. Referring back to FIG. 13, the light WS then propagates through the polarization controller 24, where its polarization is adjusted for efficient passage through the polarizer 32, as discussed previously. For example, if the polarizer 32 is deisgned to pass light having a linear, vertical polarization, the controller 24 should be adjusted to rotate the direction of polarization by 45 degrees, in a direction opposite that produced by the rotator 124, so that the light is again vertically polarized. The light is then split into counter-propagating waves W1, W2 by the coupler 34, for propagation about the loop 14. After transversing the loop 14, the waves W1, W2 are recombined, by the coupler 34, to form the optical output signal, which proagates back through the polarizer 32. It will be recalled that the polarization controller 36 may be utilized to adjust the polarization of the counter-propagating waves so that the optical output signal passes efficiently through the polarizer 32, e.g., with a linear, vertical polarization. The polarization controller 24, being a reciprocal device, then rotates the direction of polarization of the optical out put signal by 45 degrees so that it now has the same polarization upon exiting the controller 24 as the source light did when it entered the controller 24. Accordingly, as shown in FIG. 15, the optical output signal, labeled WO, is shown as entering the isolator 120 with a polarization that os identical, from the point of view of an observer, to the polarization of the source light WS (FIG. 14) exiting the isolator 120. When the optical output signal WO passes through the rotator 124, the direction of polasrization is rotated by another 45 degrees. It s a unique feature of the rotator 124 that the direction of rotation is the same regardless of the direction of propagation of the light. Thus, the first 45-degree rotation of the source light and the second 45-degree rotation of the optical output signal will add so that the optical output signal WO has a horizontal direction or polarization when it leaves the rotator 124. Since the operator 122 rejects polarizations which are orthogonal to those that it passes, the optical output signal WO will be prevented from propagating through the polarizer 122 to the light source 10. The polarizer 122 couples light from the fiber 12, so that the signal WO will be emitted from the polarizer 122 in a directional, diverging beam. Preferably, the polarizer 122 is of the same type as discussed above in reference to the polarizer 32. It is signifigant that the light rejected by this type of polarizer is emitted therefrom in a directional ray, having a relatively low divergence angle (e.g., 20°), and thus, the photo-sensitive surface of the detector 30 does not need to be execially large or uniquely shaped. In the embodiment shown, this photosensitive surface is about 1 mm in diameter.

The light may be impressed upon the detector 30 by focusing it thereon, utilizing the lens 126, as discussed above. Alternatively, an optical fiber (not shown) having a core diameter of, e.g., 500 microns, may be utilized to guide the light to the detector 30, by positioning one end of the fiber immediately adjacent to the polarizer so that the ight rejected by the polarizer is introduced into the fiber, and by positioning the other than the fiber so that light from the fiber is imporessed upon the detector 30. It should be noted that, even if all of the light rejected by the polarizer 122 is not impressed upon the photosensitive surface of the detector 30, e.g., due to slight misalignment of the focussing lens or guiding fiber, this is more than compensated by the increase in the intensity of the optical signal resulting from elimination of the coupler 26 (FIG. 1).

Further, it is also significant that, when light is rejected by the polarizer, the orientation of the above described directional ray, emitted from the polarizer 122, will be different for one direction of propagation than for the other. That is, for propagation in one direction, light is emitted on one side of the polarizer 122, while, for propagation in the other direction, the light is emitted on the opposite side of the polarizer. Therefore, even if the source light polarization polarization is not precisely the same as that passed by the polarizer, any source light rejected by the polarizer will be directed towards the detector, and thus, will not interfere with measurement of the optical output signal intensity.

Figure 16:
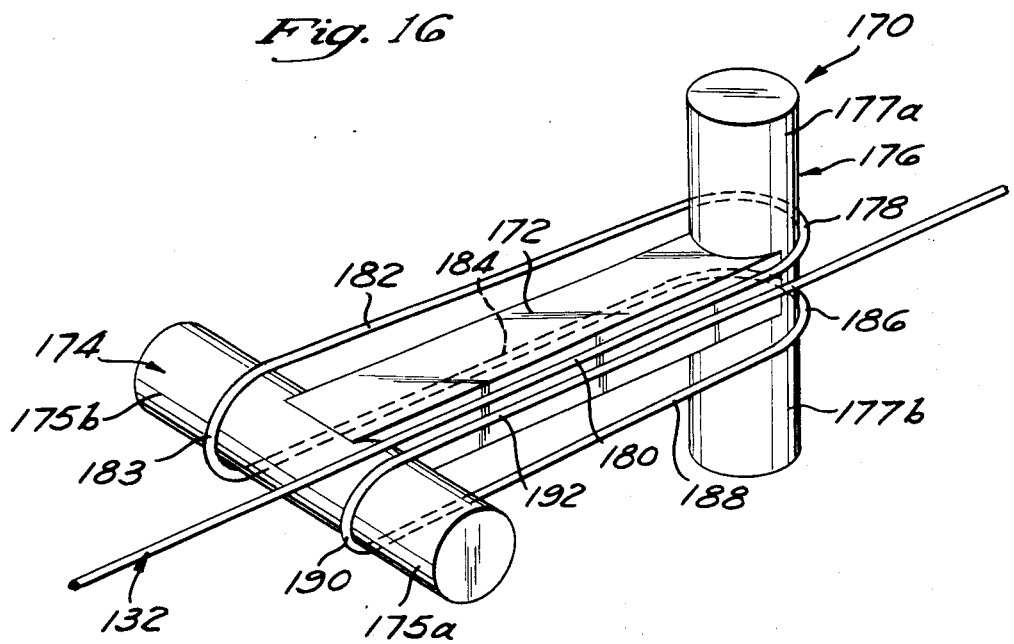
FIG. 16 is a perspective view showing the preferred manner of wrapping an optical fiber to form a magneto-optic rotator.

A preferred type of Faraday rotator 124 for use in the isolator 120 is described and claimed in co-pending patent application, Ser. No. 319,421, filed on the same date as the present application, entitled MAGNETO-FIBER OPTIC ROTATOR, assigned to the assignee of the present invention. This application is hereby incorporated herein by reference. As shown in FIG. 16, the magneto-optic rotator comprises a fiber 132 wrapped upon a mandrel 170 to provide a series of fiber loops having curved portions and straight portions. The mandrel 170 is made from a nonferrous material, such as aluminum, and comprises a central bar portion 172, square in cross-section. A pair of cylindrical portions 174, 176 are formed at the respective ends of the central portion 172, and perpendicular thereto. The cylindrical portions 174, 176 are oriented so that they are mutually perpendicular. As viewed in FIG. 16, the cylindrical portion 174 has a right end 175a left end 175b. projecting from respective parallel sides of the central portion 172. Similarly, the cylindrical portion 176 has an upper end 177a, and lower end 177b, projecting from respective parallel sides of the central portion 172. Further, the cylindrical portions 174, 176 have diameters which are equal to or larger than the sides of the central portions 172.

The fiber 132 is first wrapped around the upper end 177a of the cylindrical portion 176 to form a curved fiber portion 178 joining two straight portions 180, 182. Next, the fiber is wrapped around the left end 175b of the horizontal cylindrical portion 174 to form a curved portion 183 joining the straight portion 182 with a straight portion 184. The wrapping continues by forming another curved portion 186 around the lower end 177b of the vertical cylindrical portion 176 to join the sraight portion 184 to a straight portion 188. Finally, another curved portion 190 is formed, by wrapping the fiber 132 around the right end 175b of the horizontal portion 174 to join the straight portion 188 with a straight portion 192. It will be understood that the wrapping is accomplished so that the straight portions 180, 182, 184, 188 and 192 are parallel to each other. Further, by wrapping the fiber in the foregoing manner, the curved portions 178, 186 will lie in a horizontal plane, while the curved portions 183, 190 lie in a vertical plane.

Although, for clarity of illustration, only four turns (curved portions) are provided in the fiber 132 of FIG. 16, it will be understood that the fiber 132 may be wrapped in the same manner to provide additional turns. For example, in one embodiment, which has been constructed, a total of 32 turns are utilized. The specificatiions for this embodiment are as follows:

| Number of curved portions: | 32 |

-continued

| | |
|---|---|
| Number of straight portions: | 33 |
| Length of one straight portion: | 12 cm |
| Diameter of mandrel cylindrical portion: | 2.5 cm |
| Number of turns for each curved portion: | 1.5 |
| Outside diameter of the fiber: | 110 microns |
| Wavelength of the light: | 0.633 microns |
| Total length of fiber: | 4 meters (approx.) |

Figure 17:
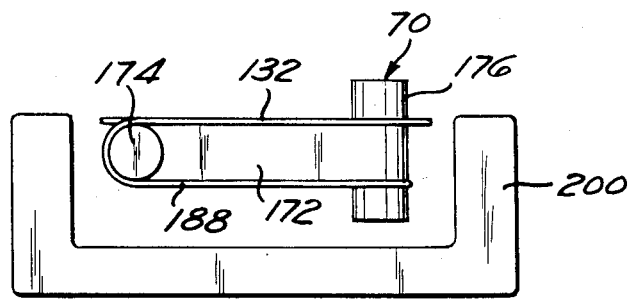
FIG. 17 is a schematic drawing of one embodiment of a magneto-optic rotator for use in the optical isolator shown in FIG. 13.

A magnetic field is applied to the fiber 132 by positioning the mandrel 170 between the poles of a magnet 200, as shown in FIG. 17, so that the B field of this magnet is parallel to the straight portions of the fiber 132. The magnet 200 may be of any suitable type or shape. For example, it may be either an electro-magnet or permanent magnet. Further, the magnet may be e.g., shaped as a toroid, or as a horseshoe.

As light propagates through these straight portions 80, 82, 84, 88 and 92, its direction of polarization is rotated by the magnetic field, in accordance with the Faraday effect. With the fiber 132 wrapped in the manner shown in FIG. 16, light propagating through the fiber 132 reverses its direction of porpagation as it travels from one straight portion to another straight portion. Thus, it will propagate in the same direction as the B field e.g., through the straight portions 180, 184 and 192, but will propagate in the opposite direction from the B field through e.g., the straight portions 182 and 188. Under these circumstances, one would ordinarily expect that due to propagation around he curved portions 178, 183, 186, 190, the direction of polarization in one straight portion would be the mirror image of that in an adjacent straight portion, and thus, the rotation due to the Faraday effect in any two adjacent straight portions would cancel, yielding a net rotation of zero. However, in the present invention, the curved portions 178, 183, 186, 190 are formed to create a linear birefrigence sufficient to provide a spatial separation between light in the polarization modes of one-half wavelength, or phase difference of 180 degrees. This advantageously causes the direction of polarization as viewed by an observer, to be the same in each of the straight portions 180, 182, 184, 188, 192, so that the Faraday rotations add to each other, rather than cancel each other. Thus, by providing a series of straight portions, a large Faraday rotation may be obtained, even though the Faraday rotation for one of the straight portions may be relatively small.

If the strength of the magnetic field (B field) applied to the fiber 132 is approximately 1,000 gauss, a fiber wrapped according to the above specifications will provide a total Faraday rotation of 45 degrees for light propagating through the fiber in either direction. Thus, if a lightwave propagates through the fiber 132 in one direction, and returns therethrough in the other direction, the total Faraday rotation will be 90 degrees. This amount of Faraday rotation permits the magneto-optic rotator to be utilized as an optical isolator, in the manner discussed in reference to FIGS. 14 and 15.

What is claimed is:

1. an all fiber optic rotation sensor, comprising:
   a light source for producing a light wave;
   a single, continuous, uninterrupted strand of optical fiber forming a line portion and a loop portion, said light source optically coupled to said line portion for propagation of said light wave through said line portion to said loop portion;
   said single, continuous strand of optical fiber having a portion of the cladding removed from one side of said fiber at the ends of said loop portion to form first and second oval surfaces, said first and second oval surfaces juxtaposed and optically closing said loop portion to couple said loop portion and said line portion;
   a portion of said single, continuous, uninterrupted strand of fiber in said loop portion forming a coil, the diameter of said coil selected to stress said fiber to provide a birefringent medium for controlling the polarization of light propagating in said loop portion;
   a portion of said single, continuous, uninteruputed strand of optical fiber having a portion of the cladding removed from one side thereof to form a third oval surface;
   a birefringent crystal juxtaposed with said third oval surface and forming a polarizer to cause light propagating through said strand to be polarized to a preselected polarization;
   a Faraday rotator, formed on said continuous, uninterrupted strand of fiber, said Faraday rotator and said polarizer forming an optical isolator for coupling light from said line portion to provide an optical output signal indicative of the rotation rate of said loop portion, said optical output signal comprised of light coupled to said line portion from said loop portion which travels an identical optical path length through said loop to said optical isolator so that nonrotationally induced phase differences in said output signal are eliminated; and
   a detector, positioned to receive said optical output signal from said isolator, for detecting said optical output signal.

2. An all fiber optic rotation sensor, as defined by claim 1, additionally comprising a magnetic shield for shielding said loop from ambient magnetic fields.

3. An all fiber optic rotation sensor, as defined by claim 2, additionally comprising a magnetic shield for shielding said propagating in said loop portion at a specific frequency, said modulating means separated from said first and second juxtaposed oval surfaces by a fiber length in one direction around the loop which is a length L difterent than the fiber length between the modulating means and the first and second juxtaposed surfaces in the other direction areund the loop, the specific frequency equal to c/2nL, where c is the free space velocity of light and n is the equivalent refractive index of the optical fiber.

* * * * *

UNITED STATES PATENT AND TRADEMARK OFFICE
CERTIFICATE OF CORRECTION

PATENT NO. : 4,671,658

DATED : June 9, 1987

INVENTOR(S) : Shaw et al.

It is certified that error appears in the above-identified patent and that said Letters Patent is hereby corrected as shown below:

Column 1, line 47, change "the coupler" to --the counter--.

Column 1, line 54, change "manifestion" to --manifestation--.

Column 3, line 68, change "twoards" to --towards--.

Column 4, line 19, change galuim arsenide" to --gallium arsenide--.

Column 4, line 38, change "gardients" to --gradients--.

Column 9, line 14, before "respectively" insert --and velocity,--.

Column 11, line 46, after "optical" insert --output--.

Column 17, line 34, change "filed" to --field--.

Column 19, line 10, change "After transversing" to --After traversing--.

Column 19, line 25, change "that os" to --that is--.

Column 19, line 38, change "Since the operator" to --Since the polarizer--.

Column 19, line 50, change "expecially" to --especially--.

Column 19, line 59, change "ight" to --light--.

Column 19, line 60, change "the other than" to --the other end of--.

Column 19, line 61, change "imporessed" to --impressed--.

UNITED STATES PATENT AND TRADEMARK OFFICE
CERTIFICATE OF CORRECTION

PATENT NO. : 4,671,658

DATED : June 9, 1987

INVENTOR(S) : Shaw et al.

It is certified that error appears in the above-identified patent and that said Letters Patent is hereby corrected as shown below:

Column 20, line 9, delete the second occurrence of "polarization".

Column 20, line 11, change "will be" to --will not be--.

Column 22, line 2, change "an" to --An--.

Column 22, line 48, change "a magnetic shield for shielding said" to --means for phase modulating the light--.

Column 22, line 53, change difterent" to --different--.

Signed and Sealed this

Twenty-fourth Day of April, 1990

Attest:

HARRY F. MANBECK, JR.

*Attesting Officer*  *Commissioner of Patents and Trademarks*